US 6,605,555 B2

(12) United States Patent
Shelestak

(10) Patent No.: US 6,605,555 B2
(45) Date of Patent: Aug. 12, 2003

(54) METHODS OF INCREASING THE REDOX RATIO OF IRON IN A GLASS ARTICLE

(75) Inventor: Larry J. Shelestak, Bairdford, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 09/725,919

(22) Filed: Nov. 30, 2000

(65) Prior Publication Data

US 2002/0094928 A1 Jul. 18, 2002

Related U.S. Application Data

(60) Provisional application No. 60/170,286, filed on Dec. 10, 1999.

(51) Int. Cl.$^7$ .............. C03C 6/00; C03C 6/04; C03B 18/02
(52) U.S. Cl. .............. 501/27; 501/31; 501/70; 501/71; 65/99.2; 65/135.9; 65/136.3
(58) Field of Search .............. 501/27, 31, 68, 501/69, 70, 71; 65/134.1, 135.9

(56) References Cited

U.S. PATENT DOCUMENTS

| 3,830,639 | A | * | 8/1974 | Evans et al. | |
|---|---|---|---|---|---|
| 4,153,439 | A | * | 5/1979 | Tomic et al. | |
| 4,381,934 | A | | 5/1983 | Kunkle et al. | |
| 4,792,536 | A | | 12/1988 | Pecoraro et al. | ............... 501/70 |
| 4,820,328 | A | * | 4/1989 | Roberts et al. | |
| 4,886,539 | A | | 12/1989 | Gerutti et al. | |
| 5,352,640 | A | | 10/1994 | Combes et al. | ............... 501/71 |
| 5,478,783 | A | | 12/1995 | Higby et al. | .................. 501/27 |
| 5,523,263 | A | | 6/1996 | Penrod | ......................... 501/27 |
| 5,545,596 | A | | 8/1996 | Alvarex Casariego et al. | ............................ 501/71 |
| 5,641,716 | A | | 6/1997 | Higby et al. | .................. 501/27 |
| 5,688,727 | A | | 11/1997 | Shelestak et al. | ............. 501/71 |
| 5,780,372 | A | | 7/1998 | Higby | ......................... 501/70 |
| 5,807,417 | A | | 9/1998 | Boulos et al. | ............. 65/134.3 |
| 5,837,629 | A | | 11/1998 | Combes et al. | ............... 501/70 |
| 5,888,264 | A | | 3/1999 | Dickinson et al. | ......... 65/134.1 |

FOREIGN PATENT DOCUMENTS

| EP | 0 765 846 A | 4/1997 |
|---|---|---|
| EP | 0 765 846 B | 6/1999 |

* cited by examiner

Primary Examiner—David Sample
(74) Attorney, Agent, or Firm—Andrew C. Siminerio; Kenneth J. Stachel

(57) ABSTRACT

Glass is made from batch components having a source of ferrous iron to increase the starting amount of ferrous iron in the glass batch. The ferrous iron source is an iron silicate material, such as fayalite ($2FeO \cdot SiO_2$), iron garnet ($3FeO \cdot Fe_2O_3 \cdot 3SiO_2$) magnesium-iron olivine ($2(Mg,Fe)O \cdot SiO_2$), grunerite ($(6FeO \cdot 8SiO_2 FeOH)_2$), actinolite ($CaO \cdot 3(Mg,Fe)O \cdot 4SiO_2$) or iron rich anthophyllite ($((Mg,Fe)O \cdot SiO_2)$). The presence of the ferrous iron source in the glass batch components decreases or eliminates the amount of coal and also leads to a glass article having a redox ratio greater than about 0.25.

21 Claims, 1 Drawing Sheet

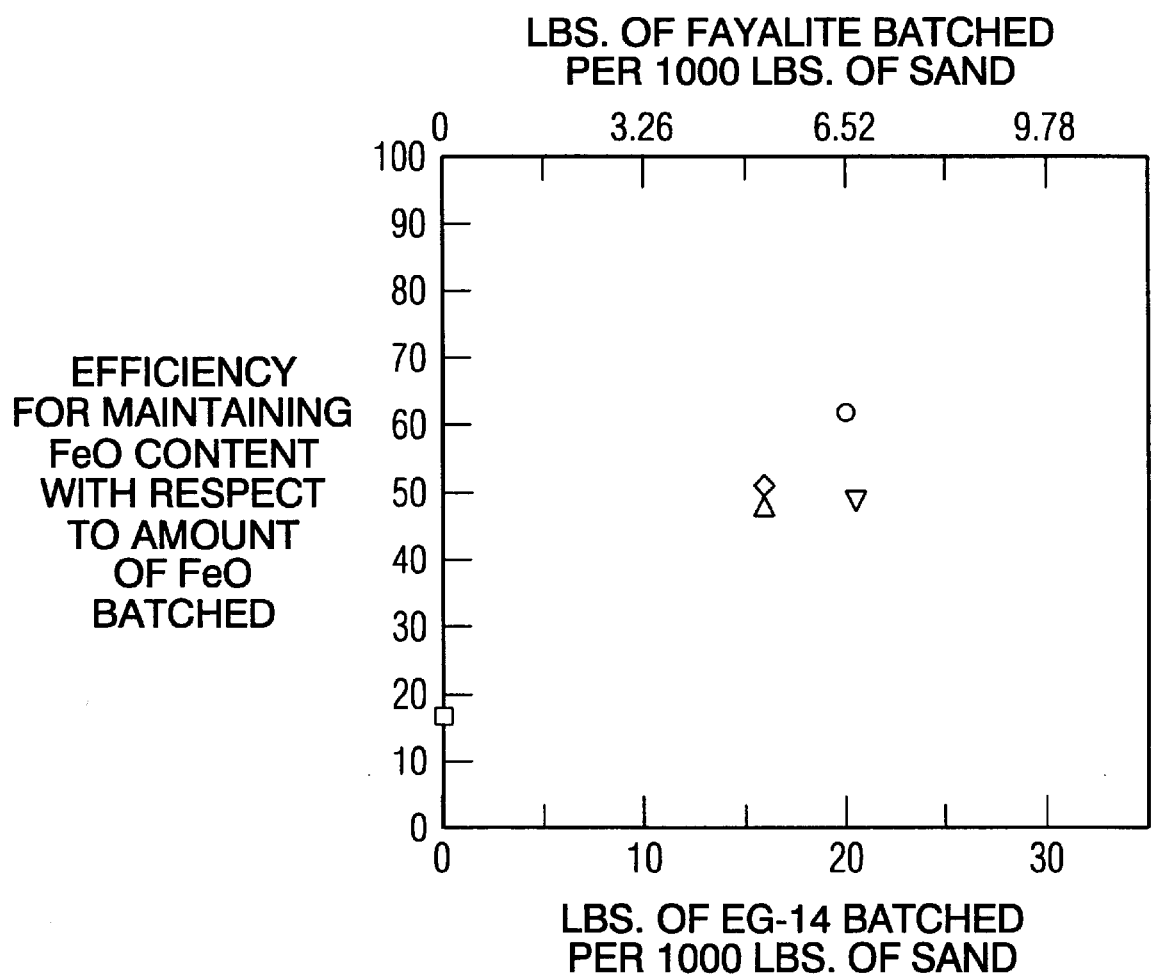

METHODS OF INCREASING THE REDOX RATIO OF IRON IN A GLASS ARTICLE

CROSS-REFERENCE TO RELATED APPLICATION

This application claims the benefit of U.S. Provisional Application No. 60/170,286, filed Dec. 10, 1999, entitled "METHODS OF INCREASING THE REDOX RATIO OF IRON IN A GLASS ARTICLE", which is herein incorporated by reference.

BACKGROUND OF THE INVENTION

The present invention relates generally to iron-containing glass articles and glass compositions and, more particularly, to a method of increasing the redox ratio of iron in glass articles and glass compositions.

In conventional float glass production operation, a batch of glass forming components is heated in a furnace to melt the glass forming components into a liquid mass. Furnaces for glass batch melting include conventional furnaces that employ chemical refining and overhead heating or other special glass melting furnaces, such as vacuum or physical refining furnaces. The melted batch components react to produce a glass which is then removed from the furnace and deposited onto a pool of molten tin. The glass is formed, processed and cooled to form solid glass articles. A basic glass batch mixture includes sand, soda ash, dolomite, limestone and sulfate (e.g. salt cake or gypsum). Additional materials may also be added which affect the final properties, e.g., color, transmittance, reflectance, optical properties etc., of the glass and/or melting characteristics of the batch. Known glass batch compositions are disclosed in U.S. Pat. Nos. 5,688,727; 5,352,640; 5,545,596; 5,837,629; 5,807,417; and 5,780,372, which are herein incorporated by reference. For example, coloring agents may be added to the batch components to achieve a desired final color of the glass. The particular batch components used and their relative amounts are selected based on the desired properties of the finished glass article and desired melting characteristics of the batch.

In order to manufacture glass having solar control properties, such as heat absorbing or infrared absorbing glass, solar control materials, such as iron-containing materials may be added to the batch forming components. The iron may be present in both the ferrous, e.g., FeO, and ferric, e.g., $Fe_2O_3$, states. However, the relative amounts of ferrous and ferric iron in the final glass article have a direct effect on the color and also the optical and solar control properties of the glass article. For example, ferrous iron absorbs light in the infrared and visible regions and generally produces glass having a blue color. Ferric iron absorbs light in the ultraviolet and visible regions and generally produces glass having a yellow color. Thus, the solar control properties of the glass, e.g., transmittance, reflectance, absorbance, etc., can depend upon the amounts of ferrous and ferric iron in the glass.

Rouge is well known and is conventionally used as a convenient source of iron when manufacturing solar control glass. However, rouge consists principally of ferric iron. Therefore, in order to produce infrared absorbing glass, it is necessary to chemically reduce at least a portion of this ferric to ferrous iron. This reduction is typically done by adding a carbon source, e.g., coal, graphite, sugar solution, etc., to the batch of glass forming components to facilitate the reduction of ferric iron to ferrous iron to increase the "redox ratio" of the glass, as defined hereinbelow. For high performance, infrared absorbing glass articles and compositions, redox ratios greater than about 0.3 are desirable. However, it is very difficult to obtain such a high redox ratio utilizing currently available glass production methods due principally to heat transfer difficulties. For example, in overhead heated furnaces, a layer of silica scum may form on top of the melt when large amounts of coal are added. The scum layer inhibits thermal transfer and hence may make it difficult to adequately heat the interior of the melt.

To increase the redox ratio, typically the amount of oxidizing agent, e.g., sulfate material such as salt cake or gypsum, added to the batch is decreased and large amounts of both rouge and carbon are added to the glass batch mixture to achieve a desired higher level of ferrous iron in the batch and hence in the resulting glass article. However, a major drawback of decreasing sulfate addition and adding more carbon is that the melting quality of the batch becomes poorer and the formation of silica scum increases, which in turn further reduces thermal transfer into the glass melt and can lead to unmelted silica stone defects. This places a practical limit on the total amount of carbon that can be added. Additionally, since the carbon is typically added in the form of coal, an increase in the amount of coal may also increase the amount of gaseous sulfur byproducts, e.g., $SO_2$, which may be produced during the glass making process due to a reaction between salt cake or gypsum and the coal. Treatment of such sulfur byproducts before release into the atmosphere may increase the cost of glass production. Further, while the addition of more rouge does lead to a higher amount of ferrous iron, it also produces a higher amount of ferric iron in the glass article and a higher total iron concentration in the glass. As the total iron concentration increases, the visible light transmittance of the glass decreases. For some commercial applications such as automotive windshield transparencies or architectural windows, it is desirable to produce a glass product which is infrared absorbing but also has a relatively high visible light transmittance, i.e., a glass product having a low total iron content which is highly reduced from $Fe_2O_3$ to FeO and with a transmittance of greater than about 60%, preferably greater than about 70% for windshields or sidelights for use in the United States.

Attempts have been made to produce glass products having good infrared absorption, i.e., glass which is high in ferrous iron, but which also has good visible light transmittance. For example, U.S. Pat. No. 5,478,783, herein incorporated by reference, discloses a glass production method in which selenium and cobalt containing coloring agents are added to the batch and wuestite is used instead of rouge as the source of $Fe_2O_3$. However, the degree of reduction is critical and must not be greater than 21.34%. Higher reduction causes the glass to become too dark and the melting process difficulty increases due to poor heat penetration into the melt.

U.S. Pat. Nos. 5,523,263 and 5,641,716, herein incorporated by reference, disclose glass production methods in which ilmenite ($FeTiO_3$) is added to the batch as a source of titanium and as a partial source of $Fe_2O_3$.

EP 765,846 and U.S. Pat. No. 5,888,264, herein incorporated by reference, disclose a method of preparing ferrous containing glass by adding a fayalite containing material to the batch. However, no disclosure is given regarding the relationship between fayalite and coal as glass batch components or how the fayalite affects the final redox ratio.

It would be advantageous to provide a method of making glass and a glass product having a relatively high redox, e.g., greater than about 0.3, ratio with a total iron content of about 0.2–2.0 wt. %, preferably 0.25–1 wt. %, where the method does not have the drawbacks of the above-discussed conventional glass making procedures. It would also be advantageous to provide a glass making method which reduces or eliminates the need for the addition of carbon, e.g., coal, to the glass forming components.

SUMMARY OF THE INVENTION

Glass is made from batch components having a source of ferrous iron added to the batch components to give a concomitant higher level of ferrous iron in the resulting glass product. Producing glass with a redox ratio above about 0.25 is an aspect of the invention. The iron source is preferably an iron silicate material, such as fayalite ($2FeO.SiO_2$), iron garnet ($3FeO.Fe_2O_3.3SiO_2$), magnesium-iron olivine ($2(Mg,Fe)O.SiO_2$), grunerite ($6FeO.8SiO_2.Fe(OH)_2$), actinolite ($CaO.3(Mg,Fe)O.4SiO_2$) or iron rich anthophyllite ($(Mg,Fe)O.SiO_2$) or any combination thereof. The presence of a ferrous iron source in the glass batch components decreases or eliminates the need for carbon and also leads to a glass article having a relatively high redox ratio, e.g., greater than about 0.25. Due to the presence of silicate in the iron source, the amount of sand present in the batch is preferably reduced in proportion to the amount of silicate present in the added iron source. Glass compositions formed from such batch components may have a total iron amount in the range of about 0.2–2.0 wt. of the glass composition.

A suitable basic batch composition for forming a soda-lime glass article of the invention generally can include about 48 to 72 wt. % silica material, e.g., sand; about 14 to 28 wt. % of a sodium material such as soda ash; about 0 to 19 wt. % of a calcium and magnesium material such as dolomite; about 0 to 15 wt. % of a calcium carbonate material such as limestone, and about 0.15 to 6.50 wt. % of a ferrous iron source, e.g., a ferrous silicate source such as fayalite. It should be appreciated that the batch composition may include other typical soda-lime glass batch additives or small amounts of other materials, such as an oxidizing material, such as a sulfate material, e.g., about 0–2.3 wt. % of gypsum, melting and refining aids, tramp materials or impurities. It should be further appreciated that additional materials may be added to color the glass and/or improve its solar performance. Rouge may also be added to the batch composition to increase the ferric iron and total iron content as desired. The batch may also have one or more colorant components such as elements or compounds of Ti, Se, Co, Cr, Ni, Mn, Ce, V, Mo or Cu intentionally added to modify the color of the glass, particularly with higher redox. Also, the batch may have 0 to 95 wt. of cullet of any type known to those skilled in the art. The batch is preferably substantially free of ferric iron. The batch may further include $Al_2O_3$ containing materials such as nepheline syenite or feldspar to produce glass having about 1½ wt. % alumina to improve the chemical and stain durability of the glass.

BRIEF DESCRIPTION OF THE DRAWING

FIG. 1 is a graph of FeO efficiency versus the amount of fayalite or EG-14 in the glass batch materials.

DESCRIPTION OF THE INVENTION

The iron oxides in the glass composition perform several functions. Ferric oxide ($Fe_2O_3$) is a good ultraviolet radiation absorber and operates as a yellow colorant in the glass. Ferrous oxide (FeO) is a good infrared radiation absorber and operates as a blue colorant. The total amount of iron present in the glasses disclosed herein is expressed in terms of $Fe_2O_3$ in accordance with standard analytical practice, but that does not imply that all of the iron is actually in the form of $Fe_2O_3$. Likewise, the amount of iron in the ferrous state is reported as FeO, even though it may not actually be present in the glass as FeO. In order to reflect the relative amounts of ferrous and ferric iron in the glass compositions, the term "redox" shall mean the amount of iron in the ferrous state (expressed as FeO) divided by the amount of total iron (expressed as $Fe_2O_3$). Furthermore, unless stated to the contrary, the term "total iron" shall mean total iron expressed in terms of $Fe_2O_3$, the term "$Fe_2O_3$" shall mean iron in the ferric state expressed in terms of $Fe_2O_3$ and the term "FeO" shall mean iron in the ferrous state expressed in terms of FeO. The amount of ferrous iron oxide is multiplied by a conversion factor of 1.111 to obtain a $Fe_2O_3$ equivalent.

In order to produce a solar control glass article having a relatively high iron redox ratio, e.g., greater than about 0.3, an iron source comprising ferrous iron is added to the glass batch components in accordance with the invention. This iron source preferably comprises an iron silicate source having ferrous iron, such as fayalite ($2FeO.SiO_2$), iron garnet ($3FeO.Fe_2O_3.3SiO_2$), magnesium-iron olivine ($2(Mg,Fe)O.SiO_2$), grunerite ($6FeO.8SiO_2.Fe(OH)_2$), actinolite ($CaO.3(Mg,Fe)O.4SiO_2$) or iron rich anthophyllite ($(Mg,Fe)O.SiO_2$). Fayalite occurs naturally as a mineral or may be prepared synthetically. Other sources of fayalite include slags produced from molybdenum smelting or copper production processes. Fayalite is more resistant to oxidation during the glass making process than ferrous iron oxides, such as FeO or $Fe_3O_4$.

In order to help prevent the ferrous iron from reoxidizing to ferric iron during the melting of the glass batch components, a reducing agent, e.g., a carbon source such as graphite, coal, preferably anthracite coal, or an aqueous or nonaqueous sugar containing material may be added to the glass batch of the invention. However, the amount of the carbon source, e.g., coal, required in the practice of the invention is less than that needed when rouge is the only source of iron. Therefore, such a reduction alleviates some of the problems associated with such coal addition. As discussed in more detail hereinbelow, to achieve a desired iron redox ratio in the glass article, the amount of coal added to the glass batch is directly related to the amount of ferrous source added to the glass batch components. The amount of ferrous iron in the glass article, and hence the amount of ferrous source added to the glass batch components, will depend upon the use contemplated for the glass article and what solar control properties are desired. However, a suitable finished article, e.g., flat glass, should comprise about 0.2–2.0% by weight of total iron including both ferrous and ferric iron with the redox ratio greater than about 0.25.

A suitable basic batch composition of the invention can include 48 to 72 wt. % of silica material, e.g., sand; 14 to 28 wt. % of soda ash; 0 to 19 wt. % of dolomite; 0 to 15 wt. % of limestone and about 0.15 to 6.50 wt. % of an iron source, preferably a ferrous iron source such as one or more iron silicates. Additionally, an oxidizing material, such as 0.10 to 2.30 wt. % of sulfate material, e.g., gypsum or salt cake, may be added. Further, 0.01 to 0.50 wt. % of coal may be included in the batch as a chemical reducing agent. The sulfate material helps reduce bubble defects. During refining, the sulfate material yields sulfur dioxide and oxygen.

It should be appreciated that the glass batch composition of the invention may include small amounts of other materials, for example melting and refining aids, tramp materials or impurities, such as elements or compounds of sodium, potassium, calcium, magnesium, manganese, aluminum, sulfur, strontium, zirconium, chlorine, cobalt, nickel, selenium, chromium, molybdenum, barium, titanium, cerium, tin, zinc or iron.

It should be further appreciated that additional materials may be included to color the glass or improve its solar performance, such as elements or compounds of titanium, selenium, cobalt, cerium, vanadium, molybdenum, chromium, nickel, manganese or copper. Generally, as the amount of the colorants increases in the glass composition, the visible, IR and UV transmittance decreases. As materials are added to change the glass color or enhance solar performance, care must be taken to maintain the visible light transmittance and color required for that particular application. It should be remembered that changing the thickness of the glass will affect the spectral properties so that a particular composition which has acceptable color and performance at a particular thickness may not be acceptable at a different thickness.

Additionally, cullet may be added to the batch composition before or during melting. The cullet may be clear or may include coloring agents such as those discussed above. The cullet may also include iron in either the ferrous or ferric states, although the ferrous state is desired for most solar control glass products.

Additionally, the amount of sulfate, typically sodium sulfate or calcium sulfate, added to the glass batch components may be reduced to slow down the oxidation of ferrous iron oxide to ferric iron oxide.

The glass of the present invention may be melted and refined in a continuous, large-scale, commercial melting operation and formed into flat glass sheets of varying thickness by the float method in which the molten glass is supported on a pool of molten metal, usually tin, as it assumes a ribbon shape and is cooled. It should be appreciated that as a result of forming the glass on molten tin, measurable amounts of tin oxide may migrate into surface portions of the glass on the side that was in contact with the tin. Typically, a piece of float glass has an $SnO_2$ concentration of at least about 0.05 wt. % in the first few microns below the surface of the glass that was in contact with the tin.

Although it is preferred that the glass disclosed herein be made using a conventional, overhead fired continuous melting operation, as is well known in the art, the glass may also be produced using a multi-stage melting operation as disclosed, for example, in U.S. Pat. Nos. 4,381,934; 4,792,536; or 4,886,539. If required, a stirring arrangement may be employed within the melting and/or forming stages of the glass production operation to homogenize the glass in order to produce glass of high optical quality.

COMPARATIVE EXAMPLE

As a reference point for purposes of the following discussion, Table I shows a sample batch composition (laboratory batch) for the formation of flat glass based on conventional Solargreen® glass manufactured by PPG Industries, Inc. of Pittsburgh, Pa. This system will be referred to herein as a "standard Solargreen® system". All of the amounts listed in Table I are in grams with equivalent wt. in parentheses. The batch composition includes rouge as a source of iron and coal and gypsum to control the reduction of ferric iron to ferrous iron.

TABLE I

| Batch Components | Solargreen ® batch |
|---|---|
| Sand | 500.00 (59.63) |
| Soda ash | 164.50 (19.62) |
| Dolomite | 121.00 (14.43) |
| Limestone | 37.40 (4.46) |
| Gypsum | 7.40 (0.88) |
| $TiO_2$ | 2.04 (0.24) |
| Rouge | 5.70 (0.68) |
| Coal | 0.40 (0.048) |

These batch components were placed in a four-inch Lavasil crucible and heated at 2650° F. for two hours in an electric furnace in an air atmosphere. The melt was fritted in water and heated again for one hour at 2650° F. The melt was then fritted a second time in water, reheated for two hours at 2650° F., then cast into a slab and annealed at 1100° F. The resultant glass (690 g) slab was analyzed by x-ray fluorescence and the results are shown in Table II as weight percentages. The FeO control in Table II was determined by a wet chemical analysis method

TABLE II

| | Solargreen ® glass |
|---|---|
| $SiO_2$ | 73.74 |
| $Na_2O$ | 12.90 |
| $K_2O$ | 0.035 |
| CaO | 8.33 |
| MgO | 3.62 |
| $Al_2O_3$ | 0.14 |
| $SO_3$ | 0.172 |
| $Fe_2O_3$ | 0.737 |
| SrO | 0.004 |
| $ZrO_2$ | 0.003 |
| Cl | 0.004 |
| CoO | <0.0003 |
| NiO | <0.0003 |
| Se | <0.0003 |
| $Cr_2O_3$ | 0.0004 |
| $MnO_2$ | 0.0032 |
| Mo | <0.0005 |
| BaO | 0.01 |
| $TiO_2$ | 0.304 |
| $CeO_2$ | <0.01 |
| $SnO_2$ | <0.001 |
| ZnO | <0.001 |
| FeO | 0.136 |
| Redox | 0.185 |

Thus, as shown in Table II, the standard Solargreen® glass had a redox ratio of 0.185. Since the only source of iron was the rouge, this means that all of the FeO in the glass (690 g×0.136% FeO=0.94 g FeO) had to come from the 5.7 g of rouge. Looking at this as an efficiency, ire., how much of the starting iron source material is converted to or remains in the FeO state, 0.94 g FeO×conversion factor of 1.111 to convert to an equivalent of $Fe_2O_3$÷5.70 g of the starting iron source material=18.2%. Thus, in this melt, only about 18.2% of the rouge is reduced to FeO. With respect to the reducing power of coal in this system, 0.94 g FeO formed÷0.4 g coal in the starting material=2.35 g FeO produced per gram of coal.

With this Solargreen® glass system as a reference, the use of an iron silicate source rather than rouge in accordance with the invention will be discussed with particular reference to the following examples.

EXAMPLE 1

Glass melts were made in similar manner to the standard Solargreen® glass system described above to determine the effect of using fayalite as a source of ferrous iron on the redox ratio of the resulting glass article. The source of fayalite was EG-14, commercially available from Barnes Environmental, Inc. of Waterdown, Ontario. EG-14 is about 23.0% FeO which is equivalent to 25.53% $Fe_2O_3$ (23.0%×1.111=25.53%). Table III shows the batch components for a first sample batch (S-1) and second sample batch (S-2) compared to that of the standard Solargreen® batch system. The batches S-1 and S-2 are similar to the standard Solargreen® glass batch described above except that in S-1 a fayalite source (EG-14) is used as an iron source with no coal present and in S-2 both fayalite and coal are present in the batch materials. All of the amounts listed in Table III are in grams with equivalent wt. % in parentheses.

TABLE III

| Batch Components | S-1 batch | S-2 batch | Solargreen ® batch |
| --- | --- | --- | --- |
| Sand | 500.00 | 500.00 | 500.00 |
|  | (59.37) | (59.38) | (59.63) |
| Soda ash | 164.50 | 164.00 | 164.50 |
|  | (19.53) | (19.48) | (19.62) |
| Dolomite | 121.00 | 121.00 | 121.00 |
|  | (14.37) | (14.37) | (14.43) |
| Limestone | 37.40 | 37.40 | 37.40 |
|  | (4.44) | (4.44) | (4.46) |
| Gypsum | 7.40 | 7.40 | 7.40 |
|  | (0.88) | (0.88) | (0.88) |
| $TiO_2$ | 2.04 | 2.04 | 2.04 |
|  | (0.24) | (0.24) | (0.24) |
| EG-14 | 9.83 | 9.83 | 0 |
|  | (1.17) | (1.17) |  |
| Rouge | 0 | 0 | 5.70 |
|  |  |  | (0.68) |
| Coal | 0 | 0.40 | 0.40 |
|  |  | (0.048) | (0.048) |

The S-1 and S-2 batches were placed in separate four-inch Lavasil crucibles and melted for two hours at 2650° F. in an electric furnace in an air atmosphere. The melts were fritted in water and again heated for one hour at 2650° F. The melts were fritted a second time in water and reheated for two more hours at 2650° F. The melts were then cast into a slab and annealed at 1100° F. The resultant glass slab (690 g) was then analyzed by x-ray fluorescence, and the results are shown in Table IV in weight percent.

TABLE IV

| | S-1 glass | S-2 glass | Solargreen ® glass |
| --- | --- | --- | --- |
| $S_1O_2$ | 73.74 | 73.64 | 73.74 |
| $Na_2O$ | 12.81 | 12.90 | 12.90 |
| $K_2O$ | 0.039 | 0.040 | 0.035 |
| CaO | 8.32 | 8.36 | 8.33 |
| MgO | 3.61 | 3.62 | 3.62 |
| $Al_2O_3$ | 0.18 | 0.19 | 0.14 |
| $SO_3$ | 0.171 | 0.107 | 0.172 |
| $Fe_2O_3$ | 0.793 | 0.800 | 0.737 |
| SrO | 0.004 | 0.004 | 0.004 |
| $ZrO_2$ | 0.003 | 0.003 | 0.003 |
| Cl | 0.005 | 0.007 | 0.004 |
| CoO | 0.0012 | 0.0011 | <0.0003 |
| NiO | <0.0003 | <0.0003 | <0.0003 |
| Se | <0.0003 | <0.0003 | <0.0003 |
| $Cr_2O_3$ | 0.0016 | 0.0013 | 0.0004 |
| $MnO_2$ | 0.0037 | 0.0034 | 0.0032 |
| Mo | <0.0005 | <0.0005 | <0.0005 |
| BaO | 0.01 | 0.01 | 0.01 |

TABLE IV-continued

| | S-1 glass | S-2 glass | Solargreen ® glass |
| --- | --- | --- | --- |
| $TiO_2$ | 0.259 | 0.263 | 0.304 |
| $CeO_2$ | <0.01 | <0.01 | <0.01 |
| $SnO_2$ | <0.001 | <0.001 | <0.001 |
| ZnO | 0.05 | 0.05 | <0.001 |
| FeO | 0.158 | 0.208 | 0.136 |
| Redox | 0.199 | 0.260 | 0.185 |

As shown in Table IV, the redox ratio of the glass made from the S-1 melt (0.199) containing fayalite is higher than that of the standard Solargreen® glass discussed above (0.185). However, the glass made from the S-2 melt containing both fayalite and coal has a higher redox ratio than that of the S-1 glass with fayalite alone. From Example 1, it can be seen that if the same level of coal is used in two glass batches (e.g., the S-2 batch and standard Solargreen® batch) but fayalite is substituted for rouge, the redox ratio of the resulting glass product increases by about 0.07–0.08. From Table IV, it appears that about 9.83 grams of EG-14 per 500 g of sand (S-1) are roughly equivalent to the reducing power of about 0.4 grams of coal per 500 g of sand. Therefore, to maintain a desired redox ratio in the final glass product but using added fayalite, coal should be present but the amount of coal in the glass batch can be reduced by about 0.8 g per 1,000 g of sand for every 19.66 g of EG-14 added per 1,000 g of sand. This relationship could vary with other glass batch systems. For example, decreasing the amount of salt cake (gypsum) will increase the redox ratio and decreasing the amount of coal will decrease the redox ratio.

Turning to the relationship between iron silicate and coal addition in this system, the S-1 glass had 1.09 grams FeO in the final glass (690 grams of glass×0.158% FeO). The S-2 glass had 1.44 grams FeO. However, for S-1 glass, 2.26 grams of FeO were added per 500 grams of sand (9.83 grams EG-14×23.0% FeO). EG-14 contains 32.6 wt % fayalite and fayalite is 70.51% FeO, thus equating to 23.0% FeO. Looking at this as an efficiency, 1.09 grams FeO in the final glass/2.26 grams FeO added=48.2%, which is much higher than the 18.2% efficiency for the standard Solargreen® system described above. This means that 48.2% of the initial FeO remained in the ferrous state and 51.8% of the FeO was converted to the ferric state. Using a similar calculation, the S-2 glass had an efficiency of 63.7%.

Looking at this another way, 0.94 gram FeO in the standard Solargreen® system divided by 0.4 gram of coal added equals 2.35 gram FeO produced per gram of coal. 1.09 gram FeO in the final glass divided by 2.26 gram of FeO from iron silicate equals 0.48 gram FeO produced per gram of FeO in iron silicate. 2.35 grams of FeO/gram coal divided by 0.48 gram FeO/gram FeO in iron silicate equals 4.9 gram FeO in iron silicate per of gram coal.

EXAMPLE 2

Table V shows the batch compositions in grams for two additional fayalite containing sample glass batches S3 and S4. Batches S3 and S4 are similar to the batches described above but contain less fayalite, e.g., 7.1 g of EG-14. However, sample S3 contains no coal while sample S4 contains 0.2 g of coal. The melts were processed in similar manner as described above in Example 1, and the analyses of the resulting glass articles are shown in Table VI.

TABLE V

|  | S3 | S4 |
|---|---|---|
| Sand | 500.00 (59.57) | 500.00 (59.55) |
| Soda ash | 164.5 (19.60) | 164.5 (19.60) |
| Dolomite | 121.0 (14.42) | 121.0 (14.41) |
| Limestone | 37.4 (4.46) | 37.4 (4.45) |
| Gypsum | 7.4 (0.88) | 7.4 (0.88) |
| $TiO_2$ | 2.0 (0.24) | 2.0 (0.24) |
| EG-14 | 7.1 (0.85) | 7.1 (0.85) |
| Coal | 0 | 0.2 (0.024) |

TABLE VI

|  | S3 | S4 |
|---|---|---|
| $SiO_2$ | 73.81 | 73.82 |
| $Na_2O$ | 12.90 | 12.90 |
| $K_2O$ | 0.037 | 0.038 |
| CaO | 8.37 | 8.35 |
| MgO | 3.64 | 3.63 |
| $Al_2O_3$ | 0.17 | 0.20 |
| $SO_3$ | 0.152 | 0.149 |
| $Fe_2O_3$ | 0.587 | 0.584 |
| SrO | 0.005 | 0.005 |
| $ZrO_2$ | 0.005 | 0.003 |
| Cl | 0.005 | 0.006 |
| CoO | 0.0009 | 0.0009 |
| NiO | <0.0003 | 0.0003 |
| Se | <0.0003 | <0.0003 |
| $Cr_2O_3$ | 0.0012 | 0.0012 |
| $MnO_2$ | 0.0034 | 0.0028 |
| Mo | <0.0005 | <0.0005 |
| BaO | 0.01 | 0.01 |
| $TiO_2$ | 0.257 | 0.256 |
| $CeO_2$ | <0.01 | <0.01 |
| $SnO_2$ | <0.001 | <0.001 |
| ZnO | 0.04 | 0.04 |
| FeO | 0.116 | 0.118 |
| Redox | 0.198 | 0.202 |

In these samples also, the use of a small amount of coal (0.2 g) causes an increase in the redox ratio over a system with no coal. However, the relationships discussed above with respect to the extent of increased redox ratio in the modified Solargreen® system do not appear to hold in this system. It is believed that this lower level of fayalite and coal addition are not sufficient to overcome the oxidizing effects of the salt cake addition and the air atmosphere inside the electric furnace that was used during melting of the laboratory glasses.

Calculating the efficiencies of these systems as discussed above, S-3 had an efficiency of 49.0% while S-4 had an efficiency of 49.8%.

FIG. 1 shows a graph of the efficiencies for the S-1 to S-4 systems and the standard Solargreen® system of Table I versus the amount of EG-14 or fayalite in the batch material per 1000 lb. of sand. In FIG. 1, the symbols for the various systems are: Δ is the S-1 system, ◇ is the S-2 system, ○ is the S-2 system at double the coal and ▽ is the standard Solargreen® system at double the amount of coal. FIG. 1 shows that the efficiency of the system increases by either adding coal or increasing the amount of fayalite. However, it appears from FIG. 1 that for the exemplary systems, more than about 0.4 lb. of coal for 1000 lb. of sand are needed to overcome the oxidizing effects of the gypsum and air atmosphere used in the production of the glass.

ILLUSTRATIVE EXAMPLE 3

Table VII shows theoretical batch compositions for several iron silicate containing batch materials (S6–S11) to produce glass having similar properties as a conventional glass batch (S5) made with rouge. The numbers are in grams with the equivalent weight percent in parentheses.

These sample batches are presented to show that since the ferrous iron sources used in accordance with the invention are iron silicates, the amount of sand added to the batch should be reduced by an amount substantially equivalent to the amount of silicate introduced into the system.

TABLE VII

|  | S5 | S6 | S7 | S8 | S9 | S10 | S11 |
|---|---|---|---|---|---|---|---|
| Sand | 1000.00 (59.90) | 997.38 (59.83) | 996.85 (59.77) | 994.75 (59.81) | 999.25 (59.93) | 986.00 (59.38) | 989.51 (59.50) |
| Soda ash | 323.00 (19.35) | 323.00 (19.38) | 323.00 (19.37) | 323.00 (19.42) | 323.00 (19.37) | 323.00 (19.45) | 323.00 (19.42) |
| Limestone | 87.60 (5.25) | 87.60 (5.25) | 87.60 (5.25) | 96.34 (5.79) | 87.60 (5.25) | 90.53 (5.45) | 96.34 (5.79) |
| Dolomite | 242.50 (14.53) | 242.50 (14.55) | 242.50 (14.54) | 226.39 (13.61) | 242.50 (14.54) | 226.39 (13.63) | 226.39 (13.61) |
| Salt cake | 7.20 (0.43) | 7.20 (0.43) | 7.20 (0.43) | 7.20 (0.43) | 7.20 (0.43) | 7.20 (0.43) | 7.20 (0.43) |
| Rouge | 7.32 (0.44) | 0 | 0 | 0 | 0 | 0 | 0 |
| CoO | 0.011 (0.0007) | 0.011 (0.0007) | 0.011 (0.0007) | 0.011 (0.0007) | 0.011 (0.0007) | 0.011 (0.0007) | 0.011 (0.0007) |
| Fayalite | 0 | 8.877 (0.53) | 0 | 0 | 0 | 0 | 0 |
| Iron garnet | 0 | 0 | 9.677 (0.58) | 0 | 0 | 0 | 0 |
| Mg-iron olivine | 0 | 0 | 0 | 15.006 (0.90) | 0 | 0 | 0 |
| Grunerite | 0 | 0 | 0 | 0 | 7.231 (0.43) | 0 | 0 |
| Actinolite | 0 | 0 | 0 | 0 | 0 | 26.995 (1.63) | 0 |

TABLE VII-continued

|  | S5 | S6 | S7 | S8 | S9 | S10 | S11 |
|---|---|---|---|---|---|---|---|
| Iron rich anthophyllite | 0 | 0 | 0 | 0 | 0 | 0 | 20.239 (1.22) |
| Coal | 1.77 (0.11) | 0.45 (0.03) | 0.98 (0.06) | 0.45 (0.03) | 0.45 (0.03) | 0.45 (0.03) | 0.45 (0.03) |
| Total | 1669.40 | 1667.02 | 1667.82 | 1663.16 | 1667.24 | 1660.58 | 1663.14 |
| Salt cake/coal ratio | 4.07 | 15.92 | 7.35 | 15.92 | 15.92 | 15.93 | 15.92 |

Comparing the relative iron compositions of the iron silicates with that of rouge on an atomic weight basis, fayalite (2FeO—SiO$_2$) is theoretically 70.51 wt % FeO and 29.49% SiO$_2$. Multiplying the FeO percentage of fayalite by 1.111 to convert this to an equivalent of Fe$_2$O$_3$, fayalite is theoretically equivalent to 78.34% Fe$_2$O$_3$ compared with rouge which is about 99% Fe$_2$O$_3$. Using similar calculations, iron garnet (3FeO.Fe$_2$O$_3$.SiO$_2$) is 71.86% Fe$_2$O$_3$, magnesium iron olivine (2(Mg,Fe)O.SiO$_2$) is 46.34% Fe$_2$O$_3$, grunerite (6FeO∃8SiO$_2$° Fe(OH)$_2$) is 96.17% Fe$_2$O$_3$, actinolite (CaO.3(Mg,Fe)O.4SiO$_2$) is 25.76% Fe$_2$O$_3$ and iron rich anthophylite ((Mg,Fe)O.SiO$_2$) is 34.36% Fe$_2$O$_3$.

Glass compositions in accordance with the invention made by the float glass process may have a sheet thickness of about 1–10 mm. For vehicle glazing applications, it is preferred that the glass sheet made in accordance with the invention have a thickness of about 1.8–5 mm. When the glass is used in selected areas of a vehicle, e.g., the windshield and front door sidelights, the glass should have an LTA of at least about 70% for U.S. applications. In addition, the glass should have a TSUV of less than about 60%, preferably less than about 50%, a TSIR of less than about 35%, preferably less than about 30%, and a TSET of less than about 55%, preferably less than about 50% at a thickness of about 0.154 inch.

Thus, by using an iron silicate material of the invention as a ferrous iron source, an increased efficiency for maintaining or converting iron oxide to FeO is obtained with an associated increase in iron redox ratio. The present invention is particularly useful for tinted flat glass applications such as automotive glass.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the above disclosure and any and all equivalents thereof.

What is claimed is:

1. The method of producing an iron-taming glass article, comprising:
    melting in a overhead fired melter a batch of glass-forming components having an iron source, wherein the iron source includes ferrous iron silicate-containing material selected from the group consisting of iron garnet, magnesium iron olivine, grunerite, actinolite and iron anthophyllite and any combination thereof with or without fayalite.

2. The method as claimed in claim 1, including refining the melted batch components to form a glass having an iron redox ratio of greater than about 0.25.

3. The method as claimed in claim 1, wherein the batch includes about 48 to 72 wt. % of sand; about 14 to 28 wt. % of soda ash; about 0 to 19 wt. % dolomite; about 0 to 15 wt. % limestone and about 0.15 to 6.50 wt. % of a ferrous iron source.

4. The method as claimed in claim 2, wherein the redox ratio is about 0.25 to 0.6.

5. The method as claimed in claim 4, including 0.01 to 0.50 wt. % sulfate material.

6. The method as claimed in claim 1, wherein the batch of glass-forming components contains substantially no carbon.

7. The method as claimed in claim 1, wherein the glass article is a solar control glass article.

8. The method of claim 1 which includes the step of reducing the amount of sand added to the batch by an amount substantially equivalent to the amount of silicate in the iron source added to the batch.

9. The method of claim 1 wherein the iron source includes ferrous iron silicate-containing material selected from the group consisting of, grunerite, actinolite and iron anthophyllite and any combination thereof with or without fayalite, iron garnet, magnesium iron olivine and any combinations thereof.

10. A method of producing an iron-containing glass article, comprising:
    melting in an overhead fired melter a batch of glass-forming components having an iron source to provide molten glass, wherein the iron source includes ferrous iron silicate-containing material, wherein the batch includes 48 to 72 wt. % sand; 0.15 to 6.50 wt. % fayalite and 0.01 to 0.50 wt. % coal;
    processing the molten glass to provide a glass article having a predetermined iron redox value, and
    selectively altering the batch while maintaining the predetermined iron redox ratio of the glass article by reducing the amount of coal by about 0.8 pounds per 1000 pounds of sand for every 6.4 pounds of fayalite added per 1000 pounds of sand.

11. The method as claimed in claim 10, including adjusting the amount of sand downwardly by an amount substantially equivalent to the amount of silicate in the iron silicate-containing material added to the batch.

12. An iron containing glass batch for producing an iron containing float glass article, the batch comprising an iron source comprising a ferrous iron silicate-containing material, selected from the group consisting of iron garnet, magnesium iron olivine, grunerite, actinolite and iron anthophyllite and any combination thereof with and without fayalite.

13. The batch as claimed in claim 12, further including coal.

14. An iron containing glass batch, comprising:

48 to 72 wt. % sand;

14 to 28 wt. % soda ash;

0 to 19 wt. % of dolomite;

0 to 15 wt. % of limestone;

0.1 to 2.30 wt. % of sulfate;

0.91 to 6.5 wt. % of a ferrous iron silicate source.

15. The batch as claimed in claim 14, comprising 0.01 to 0.50 wt. % of coal.

16. The batch as claimed in claim 14, including at least one coloring agent.

17. The batch as claimed in claim 14, wherein the ferrous iron source is selected from the group consisting of fayalite, iron garnet, magnesium iron olivine, grunerite, actinolite and iron anthophyllite.

18. The iron containing glass batch of claim 14 wherein the amount of the ferrous iron silicate source is in the range from 5.1 to 6.5 wt %.

19. A method for preparing a ferrous iron containing float glass composition comprising:

forming a batch of glass-forming components comprising a ferrous-containing iron source selected from the group consisting of iron garnet, magnesium iron olivine, grunerite, actinolite and iron anthophyllite and any combination thereof with and without fayalite;

melting in a overhead fired melter the batch of glass forming components; and refining the resultant melt to obtain a finished flat glass composition comprising 0.5 to 2 percent by weight total iron.

20. An iron containing glass batch, comprising:

48 to 72 wt. % sand;

14 to 28 wt. % soda ash;

0 to 19 wt. % of dolomite;

0 to 15 wt. % of limestone;

0.1 to 2.30 wt. % of sulfate;

0.15 to 6.5 wt. % of a ferrous iron silicate source wherein the ferrous iron source is selected from the group consisting of iron garnet, magnesium iron olivine, grunerite, actinolite and iron anthophyllite and any combinations thereof with and without fayalite.

21. An iron containing glass batch, comprising:

48 to 72 wt. % sand;

14 to 28 wt. % soda ash;

0 to 19 wt. % of dolomite;

0 to 15 wt. % of limestone;

0.1 to 2.30 wt. % of sulfate;

5.1 to 6.5 wt % of a ferrous iron silicate source.

* * * * *